United States Patent

[11] 3,542,413

| [72] | Inventor | James W. Hardison |
| | | 4910 Rickey Road, Yakima, Washington 98902 |
| [21] | Appl. No. | 777,245 |
| [22] | Filed | Nov. 20, 1968 |
| [45] | Patented | Nov. 24, 1970 |

[54] APPARATUS FOR STORING SPARE WHEELS UNDER VEHICLES
6 Claims, 4 Drawing Figs.

[52] U.S. Cl................................................ 294/86,
214/451; 254/166
[51] Int. Cl..................................................... E66c 1/10
[50] Field of Search.......................................... 254/166,
145; 214/451; 224/42.12, 42.22; 244/86, 89, 93

[56] References Cited
UNITED STATES PATENTS
| 1,271,435 | 7/1918 | Cloutier........................ | 294/86 |
| 3,124,385 | 3/1964 | Neptune....................... | 294/86 |
| 3,395,819 | 8/1968 | Fruetel......................... | 214/451 |
| 3,420,014 | 1/1969 | Courtois....................... | 294/89 |

*Primary Examiner*—Harvey C. Hornsby
*Attorney*—Christensen, Sanborn & Matthews

ABSTRACT: An improvement is disclosed for those apparatus which store a spare wheel at a raised site under a vehicle by means of a cable which is suspended from the site so that the wheel can be raised and lowered with respect thereto by shortening and extending the effective length of the cable. According to the improvement, the wheel is detachably connected to the cable by means of a pair of separable members, one of which is connectable to the cable and has an inoperative disposition in which it is adapted to pass through the axle opening of the wheel while connected to the cable, and an operative disposition in which it is adapted to lift the wheel in response to shortening the length of the cable. The other member is adapted to be interposed in the axle opening between the cable and the wheel to center the cable therein during the lifting operation.

Patented Nov. 24, 1970
3,542,413
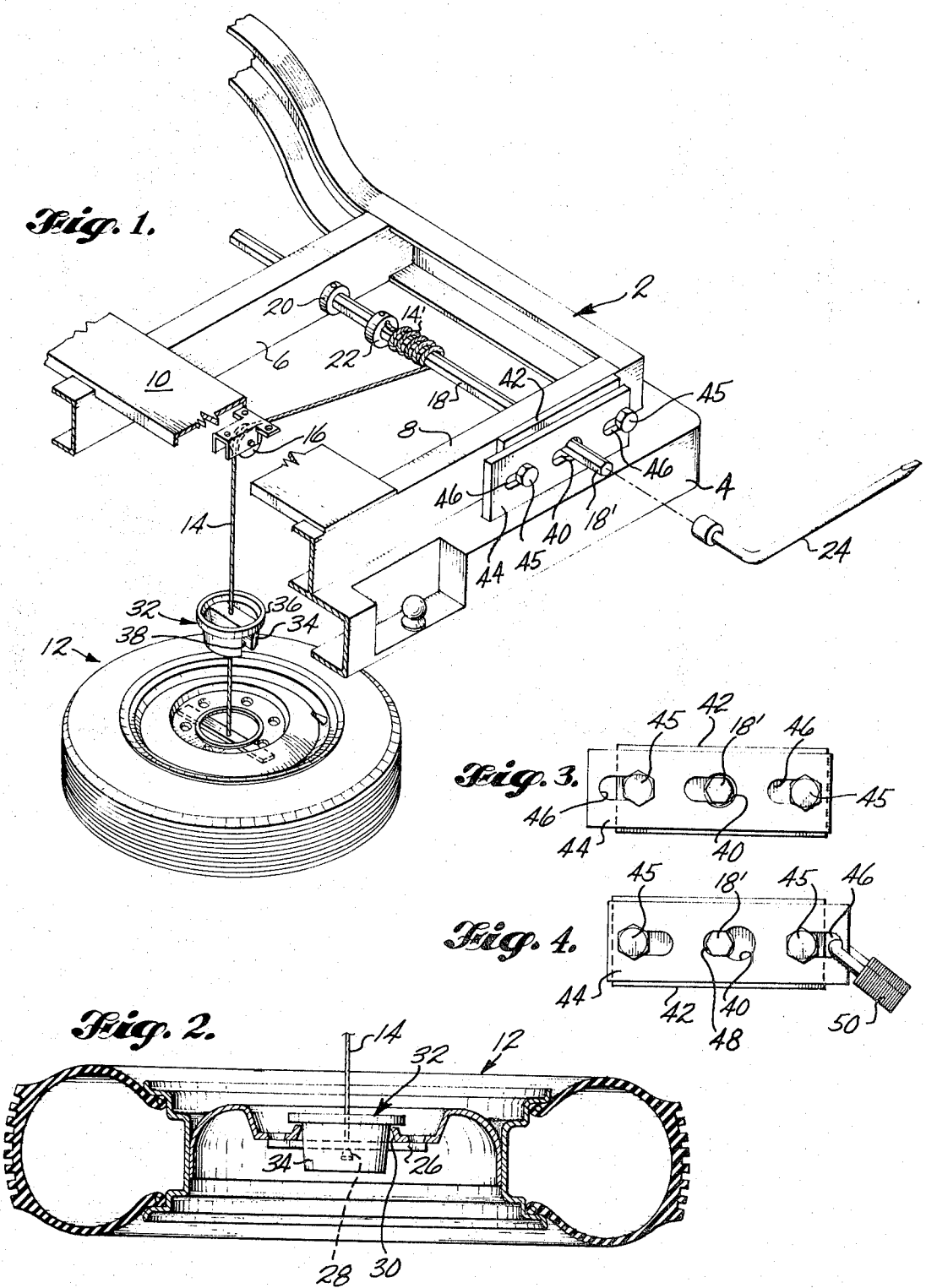
INVENTOR:
JAMES W. HARDISON
BY
Christensen Sanborn
and Matthews
ATTORNEYS

APPARATUS FOR STORING SPARE WHEELS UNDER VEHICLES

FIELD OF THE INVENTION

This invention relates to the storage of spare wheels under vehicles, and in particular to those apparatus for this purpose which operate by means of a cable or other such flexible connecter which is suspended from the site so that the wheel can be raised and lowered with respect thereto by shortening and extending the effective length of the cable.

BACKGROUND OF THE INVENTION INCLUDING CERTAIN OBJECTS THEREOF

An apparatus of the foregoing type is disclosed, for example, in U.S. Pat. No. 3,390,864, and while the apparatus is useful for the purpose intended, the gripping mechanism for fastening the cable to the wheel has not proven to be entirely serviceable and reliable in use. In particular, the mechanism operates in such a way that it is cumbersome and deceptive to those who must use it, and to women and to children in particular; and therefore, the market for the apparatus has not attained the heights expected for it.

One object of the present invention is to devise a simpler mechanism for fastening the cable to the wheel and vice versa; and also a mechanism which fully supports the wheel and is more reliable and trustworthy in operation. Another object is to devise a fastener mechanism of this nature which includes a member that is transversely extended below the wheel in use, to clamp the wheel positively against the bed or frame of the vehicle at the site where the wheel is stored. A further object is to provide a mechanism of this nature which does not rely on coiled springs and the like to interlock the mechanism with the wheel, since springs tend to weaken with age and become clogged with road dirt in use. Still further objects are to produce a fastener mechanism of this nature which is less likely to malfunction in use; which is simple and cheap to fabricate, which is easy to install and use, and which must be manipulatively removed from the axle opening of the wheel and cannot be accidentally released by vibration or by some other similar effect during the operation of the vehicle. Other objects will become apparent from the description of the invention which follows hereafter.

SUMMARY OF THE INVENTION

These and other objects are realized by an improvement of my invention wherein the wheel is detachably connected to the cable or other flexible connecter by means of a pair of separable members one of which is connectable to the cable and has an inoperative disposition in which it is adapted to pass through the axle opening of the wheel while connected to the cable, and an operative disposition in which it is adapted to lift the wheel in response to shortening the length of the cable. The other member is adapted to be interposed in the axle opening between the cable and the wheel to center the cable therein during the lifting operation. Preferably, the centering member is slidably engageable over the cable and rotationally interlocks with the lift member during the lifting operation. For example, the centering member may have a diametral slot therein, and the lift member may be adapted to engage in the slot during the lifting operation, as where the lift member takes the form of an elongated bar which is apertured to slidably engage on the cable, and there are stop means on the cable for limiting the travel of the bar with respect thereto.

In one of my preferred embodiments, the cable is connectable to a takeup device, such as a winch drum which is adapted to be rotatably mounted on the vehicle. When the wheel is suspended at the storage site therefor, a movable lock-plate is slidably engaged with a pair of flat parallel surfaces which extend along the length of the drum, so as to fix it against rotation.

In addition to that previously mentioned, the lift member may also include one or more other bars which are pivotally engaged on the cable, or pivotally engaged on the first mentioned bar, to form a complex of supporting bars which can be pivoted out of alignment for disposition below the wheel. The additional bar or bars may also engage in transverse slots in the centering member so that the latter member can fix their relative angular orientation below the wheel.

BRIEF DESCRIPTION OF THE DRAWING

These and other features of the invention will be better understood by reference to the accompanying drawing wherein:

FIG. 1 is a part perspective view of a cable-operated spare wheel storage apparatus which is installed on a vehicle that is shown only in part in the view;

FIG. 2 is a cross-sectional view through the spare wheel, illustrating the mechanism with which the wheel is connected to the cable and vice versa; and FIGS. 3 and 4 are elevational views of the alternate positions of a locking plate which is employed with the apparatus.

DESCRIPTION OF THE ILLUSTRATED EMBODIMENT

Since apparatus of the nature described are most commonly used on pickup trucks and the like, a portion of the frame and bed structure of such a truck is used to illustrate the invention in FIG. 1. In the FIG., the rear starboard corner 2 of the frame is illustrated, together with a portion of the rear bumper 4. The frame includes a pair of transverse channel members 6 and 8 on which the truck bed 10 rests as illustrated. The space between these channel members is typically wide enough to provide a raised storage site for a spare wheel and tire assembly such as that seen at 12. The wheel 12 is lowered, or raised and retained at the site, by means of a cable 14 which is suspended from a pulley 16 mounted on the bed of the truck just above the site. The other end 14' of the cable 14 is passed about, and connected to an elongated winch drum 18 which rests in opposing holes in the channel members. The drum is positioned for rotation in the holes by means of a pair of stop collars 20 which are secured to the drum by means of set screws at positions adjacent each of the members. (Only one of the stop collars 20 is seen in the FIG. due to the angle of view.) A third collar 22 is positioned between the stop collars 20 to provide a means for anchoring the cable to the drum within a slot thereon serviced by an Allen screw.

The winch drum 18 has a hexagonal cross section adapted so that the outlying end 18 thereof can be engaged by a standard lug wrench 24. As the drum is turned by the wrench, each turn shortens or extends the effective length of the cable 14 from the pulley 16 and operates to raise and lower the wheel with respect to the site.

The wheel is suspended on the cable by means of a lift mechanism which comprises an elongated bar 26 of steel having an aperture therein by which it is slidably engaged over the cable until it abuts a metal stopcap 28 (FIG. 2) clamped to the lower end of the cable. The bar 26 is easily passed through the axle opening 30 of the wheel and swung into its generally horizontal lift position, where it is prevented from shifting with respect to the wheel by means of a forked bushing 32 which is slidably engaged over the cable to drop into the opening of the wheel. The bushing has a cylindrical body 34 which is flanged at its upper rim 36 to rest on the edge of the axle opening. A slot 38 across the lower end of the body is adapted to mate with the bar 26 so that the two members are rotationally interlocked for the lifting and retaining operation.

The outlying end 18' of the winch drum is journaled in opposing holes 40 in a pair of plates 42 and 44 capscrewed to the rear cross member 8. The inside plate 42 is firmly secured to the cross member while the outside plate 44 is separated therefrom by one or more spacer washers (not shown) on each of the capscrews 45. The journal hole for the winch drum and each of the capscrew holes 46 in the outside plate 44 is orthogonally enlarged on the same side to form a lock recess 48 for the drum in the case of the journal hole 40. Thus, by shifting the outside plate 44 in either the right-hand or left-hand direction as seen in FIGS. 3 and 4, the drum can be fixed against rotation or released to turn. In the former condition, a padlock 50 is passed through the hole 46 for the right hand capscrew to secure the plate 44 against unauthorized lowering of the wheel.

In releasing the wheel for use, the lug wrench 24 is applied to the outlying end of the winch drum and the drum is given a slight clockwise turn to take up the load of the wheel while the lock plate 44 is shifted to the left to release the drum for rotation. The weight of the wheel immediately lowers it to the ground below, whereupon the truck is driven forward to expose it, or less preferably, it can be dragged from beneath the truck bed. After lifting the bushing 32, the lift bar 26 is easily manipulated into its inoperative disposition to remove it through the axle opening 30 and free the wheel.

When returning a wheel to its raised position on the vehicle, the process is reversed. In addition the padlock 50 is returned to the lock-plate 44 to secure it against tampering.

I claim:

1. A lift device for picking up a horizontally disposed body having a central recess in the underside thereof and a vertically oriented opening therethrough between the recess and the upper side of the body, comprising a cable; a bushing which is slidably engaged on the cable and adapted to fit slidably within the opening, and to project therefrom into the recess in the underside of the body, said bushing having a diametral slot across the end of the projecting portion thereof; and an elongated bar which is connected in free-swinging fashion to the cable adjacent the slotted end of the bushing and of greater length than the slot, yet adapted in dimension to be passed lengthwise through the opening in advance of the bushing, and thereafter received lengthwise in the slot to extend under the body on opposite sides of the opening, within the recess, for lifting the body by abutting the upperside of the recess as the cable is raised in the vertically upward direction.

2. The lift device according to claim 1 wherein the elongated bar has an aperture therein and is slidably engaged over the cable, there being stop means on the cable for limiting the travel of the bar with respect thereto.

3. In combination, a horizontally disposed body having a central recess in the underside thereof and a vertically oriented opening therethrough between the recess and the upper side of the body; a cable; a bushing which is slidably engaged on the cable and slidably fit within the opening so as to project therefrom into the recess in the underside of the body, said bushing having a diametral slot across the end of the projecting portion thereof; and an elongated bar which is connected to the cable and inserted lengthwise in the slot, said bar being of greater length than the slot and extending under the body on opposite sides of the opening, within the recess, for lifting the body by abutting the upper side of the recess as the cable is raised in the vertically upward direction, yet connected in free-swinging fashion to the cable and adapted in dimension so that it can be released from the body by relatively disengaging it from the slot and passing it lengthwise upwardly through the opening after the bushing is removed therefrom.

4. The combination according to claim 3 wherein the elongated bar has an aperture therein and is slidably engaged over the cable, there being stop means on the cable for limiting the travel of the bar with respect thereto.

5. The combination according to claim 3 wherein the bushing has a flange on the opposite end portion thereof which rests on the upper side of the body about the opening.

6. The combination according to claim 3 wherein the body takes the form of a spare wheel for a vehicle having the usual axle opening in the recessed center portion thereof.